(12) United States Patent
De LaForcade

(10) Patent No.: US 6,398,080 B1
(45) Date of Patent: Jun. 4, 2002

(54) PUMP-ACTION DOSING BOTTLE

(75) Inventor: Vincent De LaForcade, Rambouillet (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/679,615

(22) Filed: Oct. 5, 2000

(30) Foreign Application Priority Data

Oct. 6, 1999 (FR) .............................................. 99 12435

(51) Int. Cl.[7] .............................................. B65D 37/00
(52) U.S. Cl. ................. 222/207; 222/321.5; 222/321.7; 222/377; 222/382
(58) Field of Search ................................. 222/158, 207, 222/209, 321.7, 211, 205, 382, 377, 321.5, 464.7

(56) References Cited

U.S. PATENT DOCUMENTS

| | | | | |
|---|---|---|---|---|
| 3,628,700 A | * | 12/1971 | Dodoghue | 222/207 |
| 4,216,882 A | * | 8/1980 | Basile et al. | 222/207 |
| 5,031,802 A | * | 7/1991 | Joulia | 222/207 |
| 5,259,536 A | * | 11/1993 | Reyman | 222/207 |
| 5,279,450 A | | 1/1994 | Witt, Jr. | 222/377 |
| 5,476,198 A | | 12/1995 | Jouillat et al. | 222/377 |
| 5,829,648 A | * | 11/1998 | Goeren et al. | 222/321.7 |

FOREIGN PATENT DOCUMENTS

FR    2 643 045    8/1990

* cited by examiner

Primary Examiner—Philippe Derakshani
Assistant Examiner—Patrick Buechner
(74) Attorney, Agent, or Firm—Nixon & Vanderhye, P.C.

(57) ABSTRACT

A liquid storage and dispensing device, including a first container (1) having a first capacity, a second container (6) having a second capacity less than the first capacity, means (14) for transferring liquid from the first container (1) towards the second container (6), and a pump (33) communicating with the second container (6) for taking a particular quantity of liquid from said second container (6) and spraying it.

24 Claims, 2 Drawing Sheets

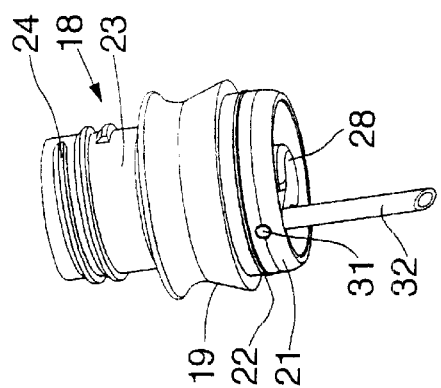
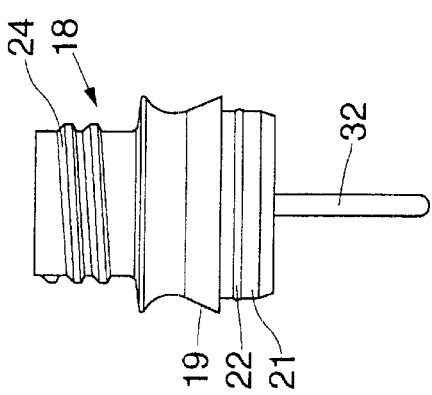
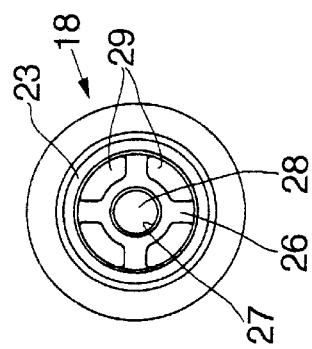
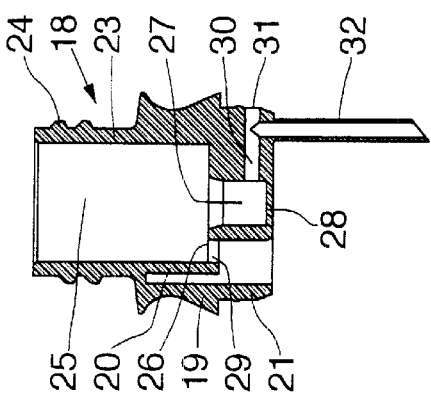

PUMP-ACTION DOSING BOTTLE

The present invention relates to the field of dosing bottles, of the type intended to contain a liquid product and provided with devices for dosing the quantities of liquid to be distributed.

The document FR-A-2 643 045 discloses a dosing bottle including a container, which is adapted to contain a liquid product and has a neck at the top, and a dosing chamber communicating with the container. The bottom of the dosing chamber includes an opening connected to a suction tube disposed in the container. The opening is provided with a non-return valve which can be opened in the direction towards the inside of the chamber by the application of a pressure from the interior of the container towards said chamber. The end of the chamber opposite the bottom is open and is associated with a closure member. The volume of the chamber is variable, its lateral walls consisting of a bellows. The end of the chamber opposite the bottom terminates inside the neck when the chamber is unfolded.

The operation of the above device is satisfactory. However, it is relatively costly because of the presence of the valve and the bellows, and it does not enable progressive use and distribution of the product contained in the bellows because, after opening, the open top end of the bellows is exposed to the atmosphere. This means that the user may distribute the liquid product unevenly over the area on which it should be deposited, and even spill some of it, which can stain the user's clothing and eliminate the benefit of the dosing facility.

Also known in the art are bottles whose capacity is equal to the dose of product to be used on each application and which have a neck on which is mounted a push-button axial pump for progressively dispensing the product, each depression of the button pumping a fraction of the dose. This type of bottle is satisfactory in terms of accurate dosing of the product but is either costly, because a pump has to be provided for each bottle, or impractical to use because, prior to each use, the pump has to be transferred from the old bottle to a new bottle after opening the new bottle.

Also known in the art are bottles which have a greater capacity which corresponds to a plurality of doses and which are also provided with a push-button axial pump which is capable of delivering a small fraction of the dose each time it is pressed. In this case the user must count the number of times the button is pressed to arrive at the dose, whence a very high risk of errors.

An object of the present invention is to remedy the drawbacks of the devices described above.

The present invention provides a combination of a container, dosing means and means for spraying a fraction of the dose.

The device according to the invention is used to store and dispense liquids and comprises a first container having a first capacity, a second container having a second capacity less than the first capacity, means for transferring liquid from the first container towards the second container, and a pump communicating with the second container for taking a particular quantity of liquid from said second container and dispensing it.

The first container can be adapted to change from a maximum volume to a minimum volume, in particular in response to pressure applied to the wall of the first container, the positive pressure generated by the corresponding reduction in volume transferring liquid from the first container to the second container.

The pump advantageously includes a pushbutton which is actuated to pump said particular quantity of liquid.

The first container advantageously includes a neck and the second container is advantageously mounted axially on said neck.

In one embodiment of the invention the transfer means include a tube extending from the bottom of the first container to a given level in said second container and defining the second capacity, surplus liquid in the second container being able to flow through the tube towards the first container.

In one embodiment of the invention the device includes an intermediate part between the second container and the pump and the second container and the pump are coaxial.

The intermediate part can include a three-portion pipe which has a first portion whose free end communicates with the bottom of the second container and which passes through the second container and is offset relative to the axis of said part and the second container, a radial second portion communicating with a third portion, coaxial with the pump and the second container and into which a suction tube of the pump is force-fitted.

In one embodiment of the invention the radial second portion extends in the vicinity of an end of the second container opposite said bottom.

The invention also provides an intermediate part for liquid storage and dispensing devices of the type comprising a first container having a first capacity, a second container having a second capacity less than the first capacity, means for transferring liquid from the first container to the second container, and a pump communicating with the second container to take a particular quantity of liquid from said second container and dispense it. Said part includes a three-portion pipe which has a first portion which has a free end offset relative to the axis of said part, a radial second portion communicating with the first portion and with a third portion coaxial with said part and adapted to receive a pump suction tube.

The radial second portion is advantageously open at the end opposite the third portion.

By squeezing the container, the user transfers the liquid product contained in said container towards the dosing means formed by the second container. After releasing the pressure on the first container, if the level of the liquid transferred into the second container is above the level of the orifice of the tube, the portion of the liquid between these two levels drops back through the tube into the first container. There then remains in the second container a particular quantity of liquid which is progressively pumped each time the user actuates the pump.

For example, a first container could be provided with a capacity of the order of a few dozen to a few hundred $cm^3$, a second container with a capacity of the order of a few $cm^3$ and a pump taking a few tenths of a $cm^3$ each time it is actuated by the user. The quantity delivered each time the pump is actuated is very small, which greatly reduces the risk of the formation of droplets of the liquid which can drop onto the clothes, for example in the case of a capillary product. Under normal conditions of use the user uses only a dose equal to the capacity of the second container each time, which does not discharge directly to the open air, which avoids the risk of spilling part of the dose and ensures that a known quantity is used each time, which is important in the case of treatment products, in particular capillary products.

The device is economical because the first container and the pump are standard components. The second container and the intermediate part are moulded from a synthetic material which can be mass-produced at low cost. A single pump enables the use of a quantity of product equal to at least one or several dozen doses.

Finally, the device is ergonomical and compact in that all its components are disposed on a single axis, which is the axis of the neck of the first container. The overall axial size is small because the intermediate part enables the axial first portion of the pipe to be offset relative to the axis common to the other components so that the liquid of the dose is taken from the bottom of the second container.

The present invention will be better understood after studying the following detailed description of one embodiment of the invention, which is given by way of non-limiting example only and refers to the accompanying drawings, in which:

BRIEF DESCRIPTION OF THE DRAWINGS

FIG. 2 is a view of the intermediate part in axial section;

FIG. 3 is a front elevation of the intermediate part;

FIG. 4 is a perspective view of the intermediate part; and

FIG. 5 is a plan view of the intermediate part.

DETAILED DESCRIPTION OF THE INVENTION

Figure 1:
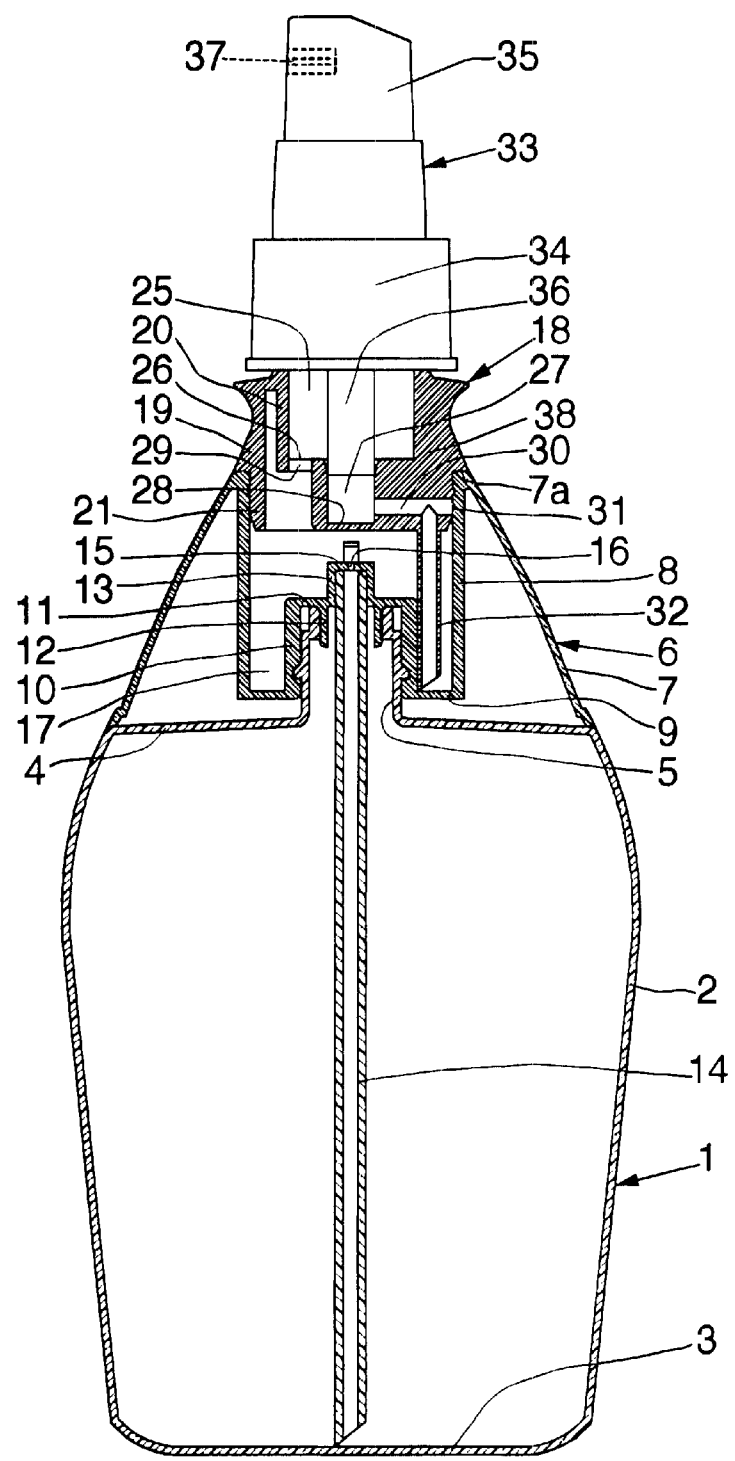
FIG. 1 is a view in axial section of the device according to the invention, showing the pump in front elevation to simplify the drawing.

FIG. 1 shows that the liquid storage and spraying device, or dosing bottle, according to the invention includes a container 1 which has a lateral wall 2, for example of circular or oval cylindrical shape, or more or less egg-shaped, a substantially plane bottom wall 3 to enable the container 1 to stand on a plane surface, not shown, a top wall 4 and a neck 5 formed at the centre of the top wall 4 and oriented along an axis perpendicular to the plane of the bottom wall 3. The neck 5 has a male screwthread.

The device includes a second container 6 disposed on top of the first container 1 and provided with a lateral wall 7 which is substantially aligned with the lateral wall 2 and whose top end forms a plane surface 7a parallel to the plane of the bottom wall 3. The second container 6 also has a circular cylindrical first portion 8 extending downwards from the top surface 7a as far as a point near the top wall 4 of the first container 1. An annular bottom radial wall 9 extends towards the inside from the bottom end of the cylindrical first wall 8, as far as a cylindrical second wall 10 whose bore has a female screwthread and which is screwed onto the neck 5 of the first container 1. The cylindrical second wall 10 extends axially upwards from the bottom radial portion 9 as far as an annular top radial portion 11 extending inwards from the cylindrical second portion 10 and adapted to come into contact with the top end of the neck 5.

The separate first and second containers are separated by at least one wall. The capacity of the second container is determined at the manufacturing stage by the disposition of its walls.

A cylindrical skirt 12 extends downwards from the top radial wall 11 and comes into contact with a bore of the neck 5 in order to improve the seal between the first container 1 and -the second container 6. The second container 6 further includes another cylindrical skirt 13 extending upwards from the top radial portion 11 of which it forms the inside boundary. A tube 14 is force-fitted into the bore of the cylindrical skirt 13 and extends downwards inside the first container 1 to a point in the immediate vicinity of the bottom wall 3 or into contact therewith, but without being blocked. An end radial wall 15 in which there is a hole 16 is connected to the top end of the cylindrical skirt 13 and enables accurate positioning of the tube 14 in the bore of said cylindrical skirt 13.

A circular space 17 is formed by the cylindrical first portion 8, the bottom radial portion 9, the inside cylindrical second portion 10, the top radial portion 11, the cylindrical skirt 13 and the end wall 15. This space is open towards the top at the same end as the top surface 7a. The portions 8, 9, 10 and 11, the skirts 12 and 13 and the wall 15 are coaxial.

The device further includes an intermediate part 18 disposed on the second container 6. The intermediate part 18 is in contact with the top surface 7aof the outside wall 7 and is force-fitted into the top end of the bore of the cylindrical portion 8.

The intermediate part 18 has an outside wall 19, whose outside surface is globally aligned with the outside wall 7 of the second container 6, and a cylindrical inside wall 20. The outside wall 19 has circular section surfaces, in particular a cylindrical inside surface, and has at its bottom end a cylindrical skirt 21 whose outside surface is provided with a seal 22 adapted to cooperate with the bore in the upper end of the cylindrical portion 8 of the second container 6. The seal 22 is either in one piece with the skirt 21 or a separate component.

The outside and inside walls 19 and 20 are joined together at the top and form a neck 23 which can be seen in FIGS. 2 to 4. The neck 23 is provided with a male screwthread 24. The neck 23 and the inside cylindrical portion 20 define a space 25 delimited by the cylindrical inside surface of said neck 23 and said inside cylindrical portion 20, at its top end by the orifice of the neck 23 and at its bottom end by an annular radial wall 26. The intermediate part 18 also includes a cylindrical portion 27 which extends downwards from the inside edge of the radial portion 26 to form a pipe and whose bottom end is delimited and closed by a radial wall 28. The radial wall 26 has at least one hole 29 through it, as can be seen in FIG. 5. In the example shown, there are four holes 29 equiangularly distributed in the circumferential direction. The space 25 of the intermediate part 18 is therefore in direct communication with the space 17 of the second container 6. The bottom portion 28 is substantially aligned with the bottom end of the cylindrical skirt 21 of the outside cylindrical portion 19.

FIGS. 1 and 2 show that the outside and inside cylindrical walls 19 and 20 are connected together over an angular sector delimited by a portion of material 29. In this portion of material 29; which extends the entire length of said, cylindrical portions 19 and 20, there is formed a pipe 30 extending radially between the bore of the cylindrical portion 27 and the outside surface of the cylindrical skirt 21.

In the assembled state shown in FIG. 1, the end 31 of the pipe 30 opening onto the outside surface of the cylindrical skirt 21 is blocked by the cylindrical portion 8 of the second container 6. Before assembly, the end 31 of the pipe 30 is open (see FIG. 4), which facilitates removal of the intermediate part 18 from the mould. The intermediate part 18 further includes a tube forming a pipe 32 which extends along an axis parallel to the axis of the intermediate part 18 and is offset radially so that said axis intersects the bottom radial portion 9. The pipe 32 is in direct communication with the pipe 30 at the top end and is open at the bottom end. In the assembled state, the pipe 32 extends to a point in the vicinity of the radial portion 9 of the second container 6 or is in contact with it but not blocked by it. The cylindrical walls 19 and 20, the skirt 21, the neck 23, the radial wall 26, the cylindrical portion 27 and the bottom portion 28 are coaxial.

The device further includes a pump 33 which can be seen in FIG. 1. The pump is of a conventional type and has an outside wall 34, which is screwed onto the neck of the intermediate part 18, a pushbutton 35 on top of the outside wall 34 and adapted to be moved axially downwards to bring about the pumping action, and a suction tube 36. The pushbutton 35 is provided with a spray nozzle 37. In the assembled state, the suction tube 36 is force-fitted into the top end of the bore of the cylindrical portion 27 of the intermediate part 18. The pump 33 is a dosing pump in the sense that each axial movement of the pushbutton 35 pumps a particular quantity of liquid, for example 0.15 cm$^3$, through the tube 36.

The device operates in the following manner. The user applies radial pressure to the lateral wall 2 of the first container 1, which is at least partly filled with liquid. That pressure reduces the volume available for the liquid in the first container 1 and causes the liquid to rise up the tube 14 into the space 17 of the second container 6. The second container 6 is advantageously made from a synthetic material that is transparent or at least translucent, enabling the user to see the liquid level present in said space 17. Graduations can also be provided for estimating the quantity of liquid present in said space 17.

If users wish to use only a small quantity of the liquid, they can stop pressing on the first container 1 when the graduation corresponding to the required quantity is reached. Otherwise, if users wish to use a maximum dose, they apply pressure until the whole of the space 17 delimited at the top by the intermediate part 18 is filled with liquid. When the user ceases to apply pressure to the lateral wall 2 of the first container 1, the liquid level in the space 17 is above the hole 16 in the end radial portion 15. The portion of the liquid above that level drops back into the first container 1 via the tube 14. The maximum dosed quantity of the liquid is therefore equal to the volume of the space 17 delimited at the top by the plane of the radial portion 15. The dose can be 6 cm$^3$, for example.

The user then actuates the pump 33 by pressing the pushbutton 35 axially downwards, which each time pumps a quantity of liquid determined by the internal characteristics of the pump 33, for example 0.15 cm$^3$. The pump 33 produces a negative pressure in the suction tube 36, which causes the liquid present in the space 17 to pass through the pipe 32, the pipe 30 and the cylindrical space also forming a pipe and delimited by the cylindrical Abortion 27 of the intermediate part 18, and thence into the sampling tube 36. The user actuates the pump 33 until all of the liquid present in the space 17 of the second container 6 has been aspirated. Accordingly, without having to count the number of times the pushbutton 35 of the pump 33 is depressed, the user has complete control over the total quantity of liquid pumped, which is equal to the quantity present in the space 17 immediately before the pump 33 is actuated for the first time.

The intermediate part 18 with the offset pipe 32 enables an arrangement with the first container 1, the second container 6, the intermediate part 18 and the pump 33 along a common axis, which has advantages in terms of compactness in the radial direction, easy holding by the user and use of standard components such as the first container 1 and the pup 33. The device is also very compact in the axial direction. FIG. 1 shows that the axial distance between the bottom end of the pump 33 and the top end of the first container 1 is small and that the pipe 32 of the intermediate part 18, the dosing means of the second container 6, which are formed by the bottom part of the space 17, and the neck 5 of the first container are at the same axial level.

The pump 33 is of the atmospheric type, i.e. with the space between the sampling tube 36 and the outside wall 34 connected to the atmosphere at the end of the stroke of the pushbutton 35. This space communicates directly with the space 25 of the intermediate part 18, which communicates directly with the space 17 of the second container 6 by virtue of the holes 29 formed in the radial wall 26. The space 17 is also in direct communication with the interior of the first container 1 via the tube 14. This enables progressive entry of air into the interior of the device during pumping.

The intermediate part 18 can be moulded in one piece from a material of medium stiffness, such as an elastomer thermoplastics material, for example Santoprene®, or a plasticized polymer such as PVC.

The device according to the present invention can be used to apply treatment product to the hair of a patient. A particular total quantity of treatment product can therefore be dispensed evenly over the hair.

What is claimed is:

1. An intermediate part for a liquid storage and dispensing device which includes a first container having a first capacity, a second container having a second capacity less than the first capacity, a structure defining a flowpath from said first container towards the second container, and a pump communicating with the second container for taking a particular quantity of liquid from said second container and dispensing it, wherein said part, having an axis, includes a three-portion pipe which has a first portion, which has a free end, offset relative to the axis of said part, a radial second portion communicating with the first portion and with a third portion coaxial with said part and adapted to receive a suction tube of the pump.

2. An intermediate part for a liquid storage and dispensing device which includes a first container having a first capacity, a second container having a second capacity less than the first capacity, a transfer element for transferring liquid from the first container towards the second container, and a pump communicating with the second container for taking a volume of liquid from said second container and dispensing it, wherein said part, having an axis, includes a three-portion pipe which has a first portion, which has a free end, offset relative to the axis of said part, a radial second portion communicating with the first portion and with a third portion coaxial with said part and adapted to receive a suction tube of the pump.

3. A part according to claim 2, wherein the radial second portion is open at an end opposite the third portion.

4. A liquid storage and dispensing device, comprising a first container having a first capacity, a second container having a second capacity less than the first capacity, a first tube defining a flow path from the first container towards the second container, and a pump communicating with the second container for taking a volume of liquid from said second container and dispensing it.

5. A storage device according to claim 4, wherein said first container is adapted to change from a maximum volume to a minimum volume wherein pressure increase generated by the corresponding reduction in volume causes liquid to be transferred from the first container towards the second container.

6. A device according to claim 4 wherein the pump includes a pushbutton which is actuated to pump said particular quantity of liquid.

7. A device according to claim 4, further comprising an intermediate part, having an axis, disposed between the second container and the pump, said second container and the pump being coaxial.

8. A device according to claim 7, wherein the intermediate part includes a three-portion pipe which has a first portion, whose free end opens into the bottom of the second container and which passes through the second container and is offset relative to the axis of said part and the second container, a radial second portion communicating with a third portion, coaxial with the pump and the second container and into which a suction tube of the pump is force-fitted.

9. A device according to claim 8, wherein the radial second portion extends adjacent and end of the second container opposite said bottom.

10. A device according to claim 4 wherein the first container has a neck and the second container is mounted axially on said neck.

11. A device according to claim 10, wherein the first tube extends from the bottom of the first container to a given level of said second container defining the second capacity, surplus liquid in the second container being able to flow through the tube towards the first container.

12. A device according to claim 11, wherein said volume of liquid inside the second container is pumped via a second tube having an axis different from an axis of said first tube.

13. A device according to claim 11, wherein the tube discharges at the centre of the second container.

14. A liquid storage and dispensing device, comprising a first container having a first capacity, a second container having a second capacity less than the first capacity, a lower portion of said second container being at a non-zero distance from a bottom of said first container, a transfer element adapted to, in response to a pressure increase inside said first container, transfer a volume of liquid from the first container towards the second container, and a pump communicating with the second container for dispensing said volume of liquid.

15. A device according to claim 14 wherein the pump includes a pushbutton which is actuated to pump said volume of liquid.

16. A storage device according to claim 14, wherein said first container is adapted to change from a maximum volume to a minimum volume thereby generating the pressure increase inside said first container.

17. A device according to claim 16, wherein said first container has a deformable wall.

18. A device according to claim 14, further comprising an intermediate part, having an axis, disposed between the second container and the pump, said second container and the pump being coaxial.

19. A device according to claim 18, wherein the intermediate part includes a three-portion pipe which has a first portion, whose free end opens into the bottom of the second container and which passes through the second container and is offset relative to the axis of said part and the second container, a radial second portion communicating with a third portion, coaxial with the pump and the second container and into which a suction tube of the pump is force-fitted.

20. A device according to claim 19 wherein the radial second portion extends adjacent an end of the second container opposite said bottom.

21. A device according to claim 14 wherein the first container has a neck and the second container is mounted axially on said neck.

22. A device according to claim 21, wherein the transfer element includes a first tube extending from the bottom of the first container to a given level of said second container defining the second capacity, surplus liquid in the second container being able to flow through the tube towards the first container.

23. A device according to claim 22, wherein said volume of liquid inside the second container is pumped in a second tube having an axis different from an axis of said first tube.

24. A device according to claim 22, wherein the first tube discharges at the centre of the second container.

\* \* \* \* \*